Figure 1:
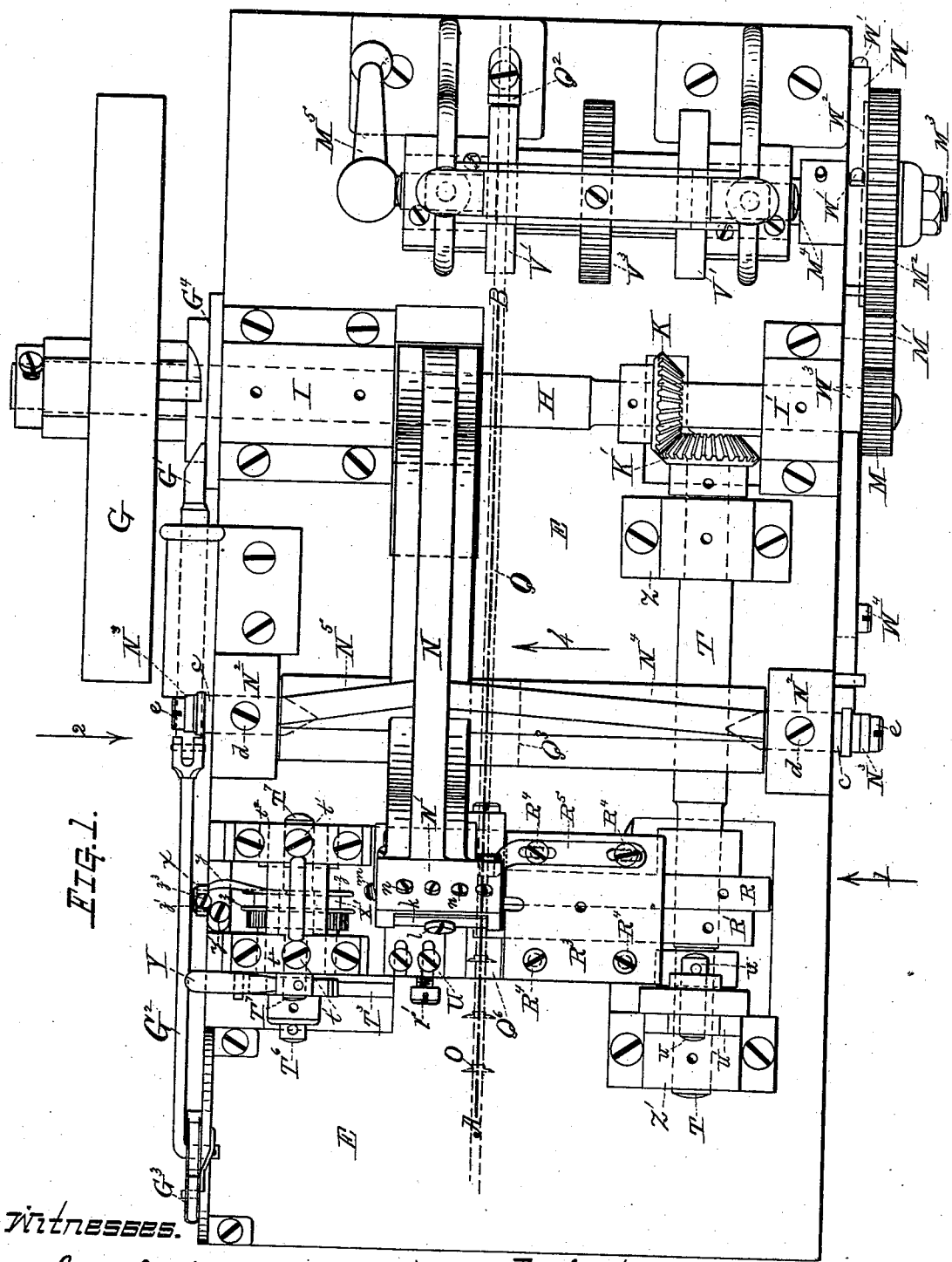

(Model.)

6 Sheets—Sheet 1.

D. C. STOVER.
Machine for Manufacturing Metallic Strip Fencing.

No. 240,477. Patented April 19, 1881.

Witnesses.
Louis Karcher
Charles T. Mea

Inventors.
Daniel C. Stover

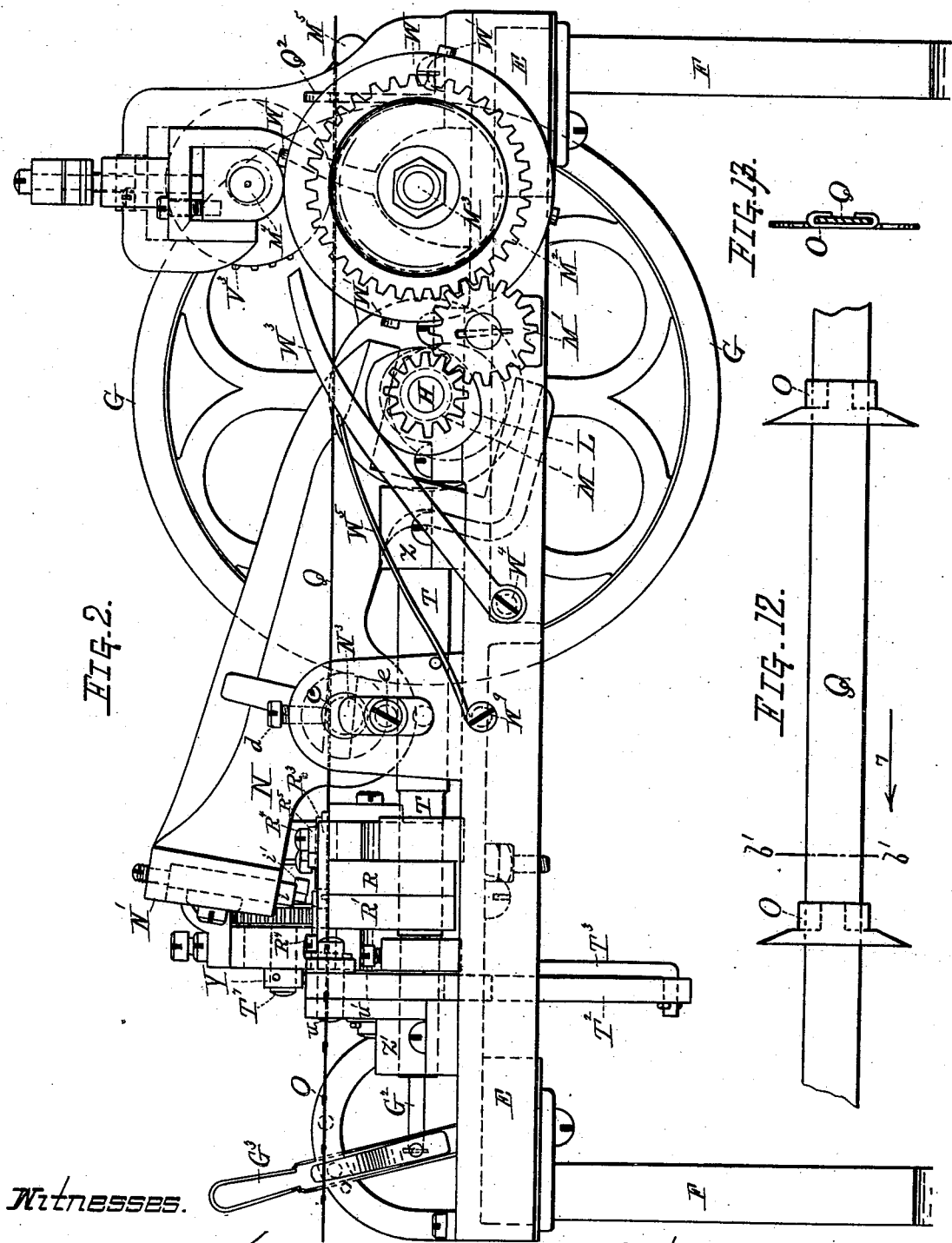

(Model.)
6 Sheets—Sheet 3.
D. C. STOVER.
Machine for Manufacturing Metallic Strip Fencing.
No. 240,477. Patented April 19, 1881.
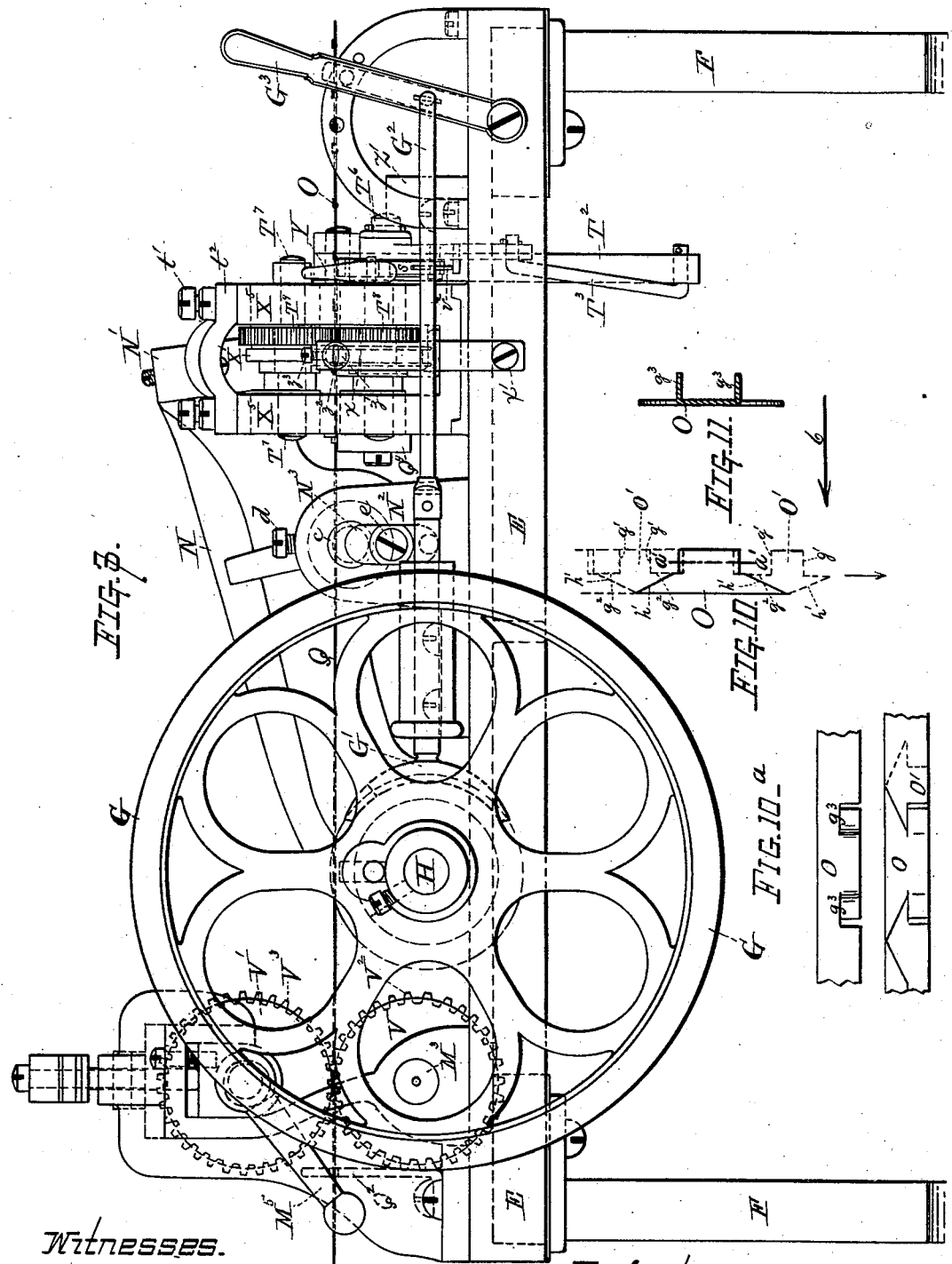
Witnesses.
Louis Karcher
Charles T. Men
Inventors.
Daniel C. Stover

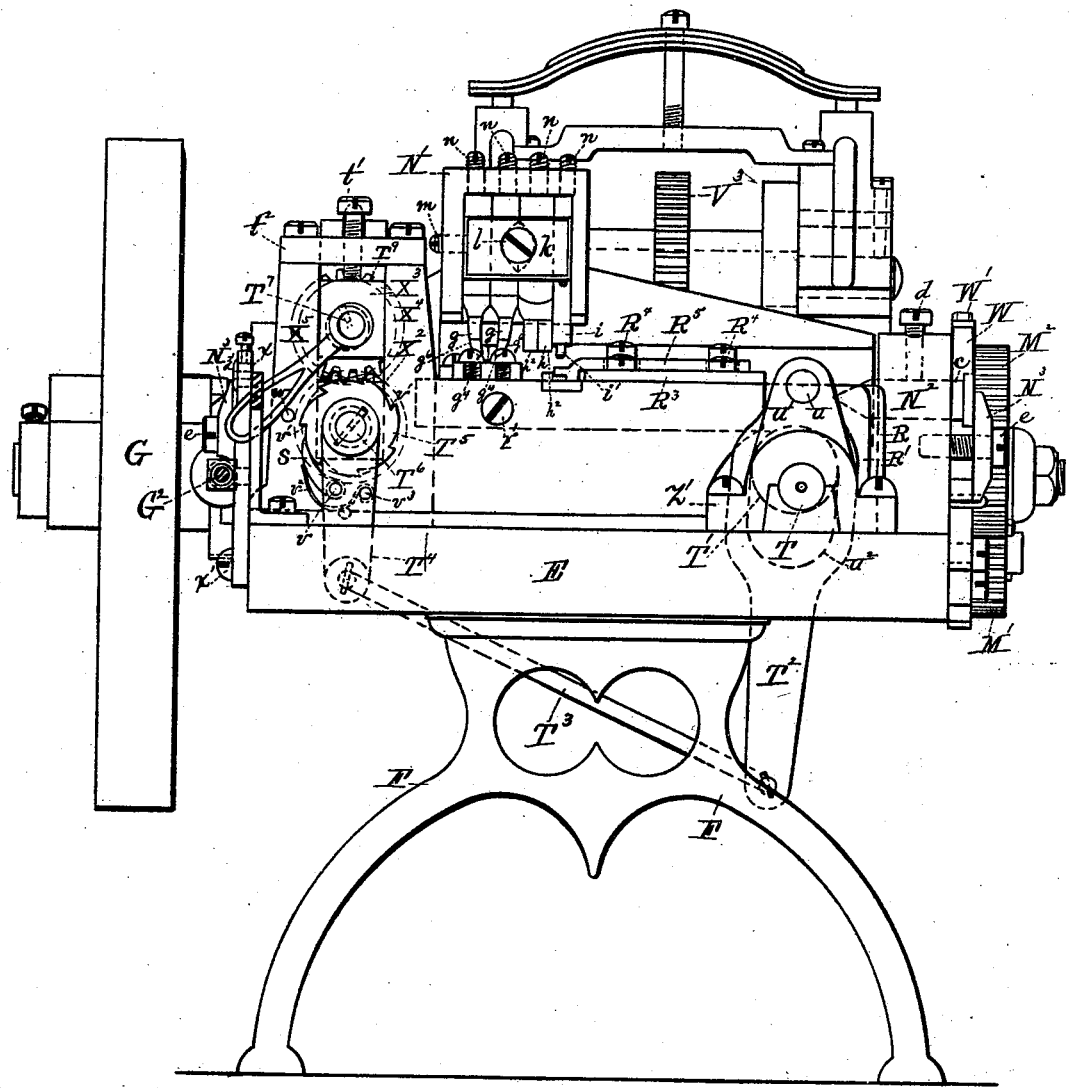

(Model.) 6 Sheets—Sheet 5.
D. C. STOVER.
Machine for Manufacturing Metallic Strip Fencing.
No. 240,477. Patented April 19, 1881.
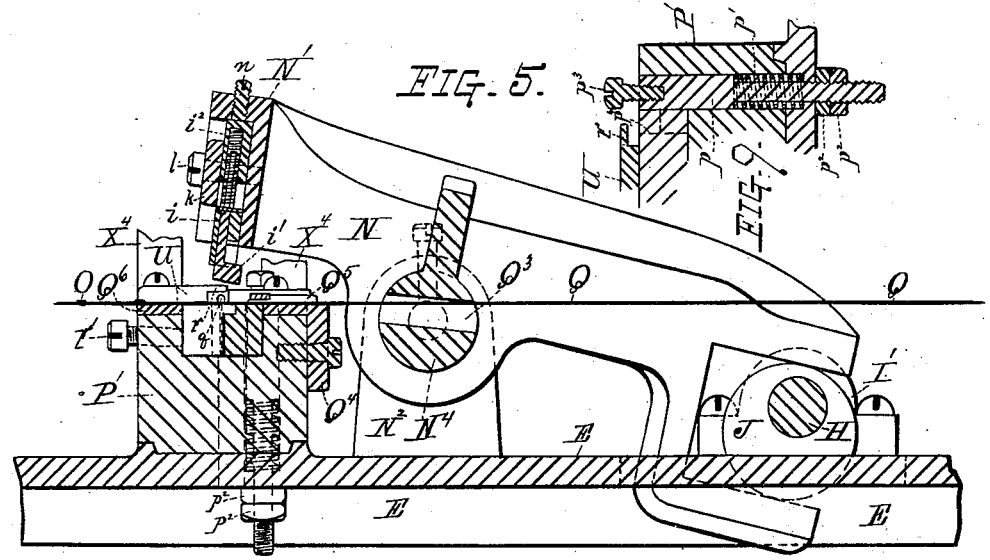
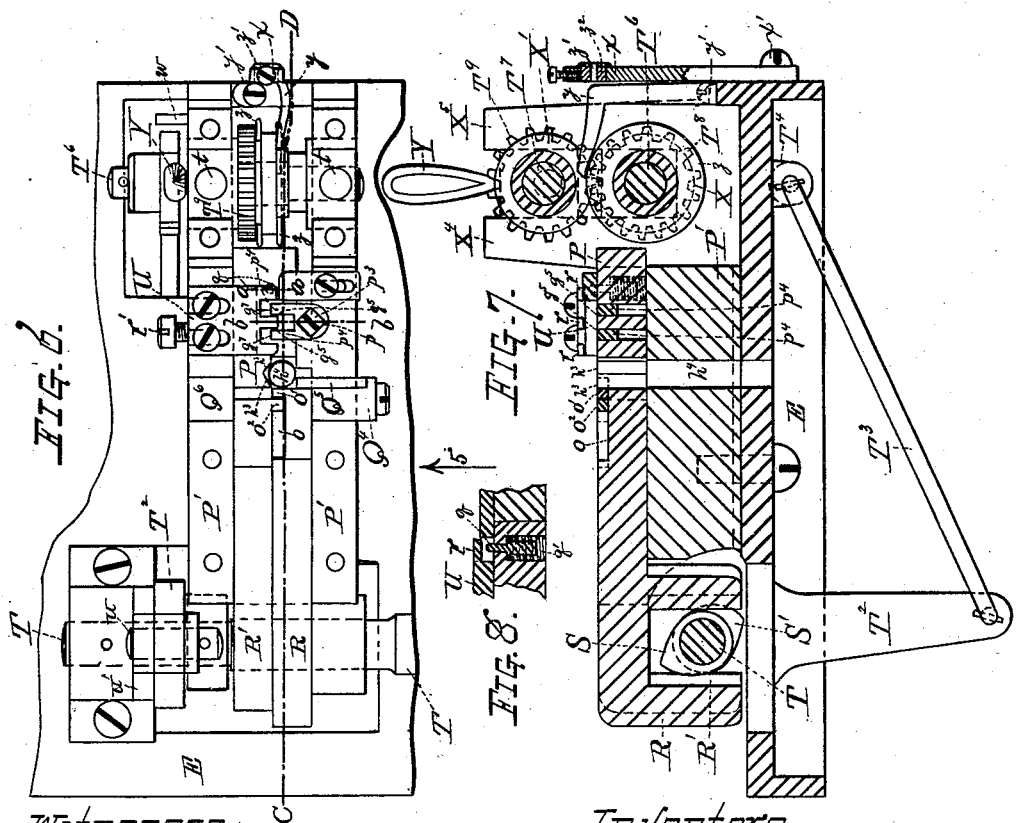
Witnesses. Inventors.
Daniel C. Stover (Model.) 6 Sheets—Sheet 6.
D. C. STOVER.
Machine for Manufacturing Metallic Strip Fencing.
No. 240,477. Patented April 19, 1881.
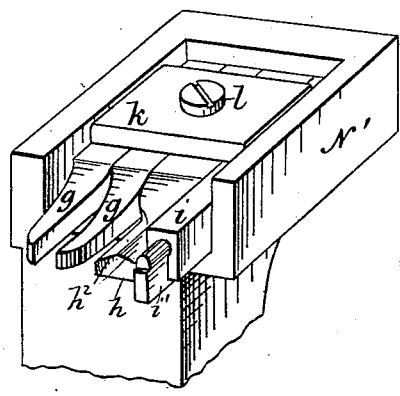
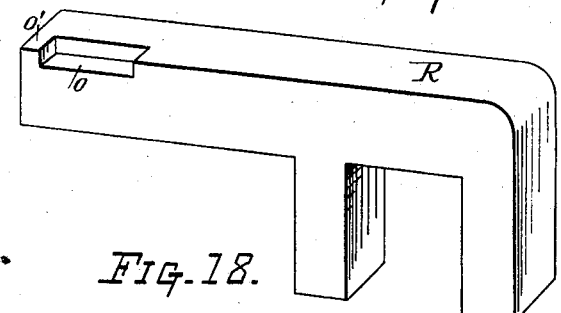
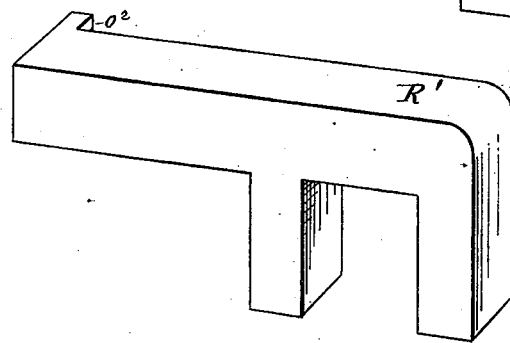
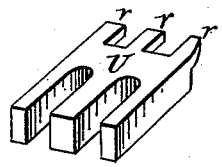
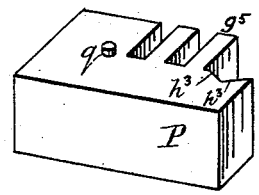
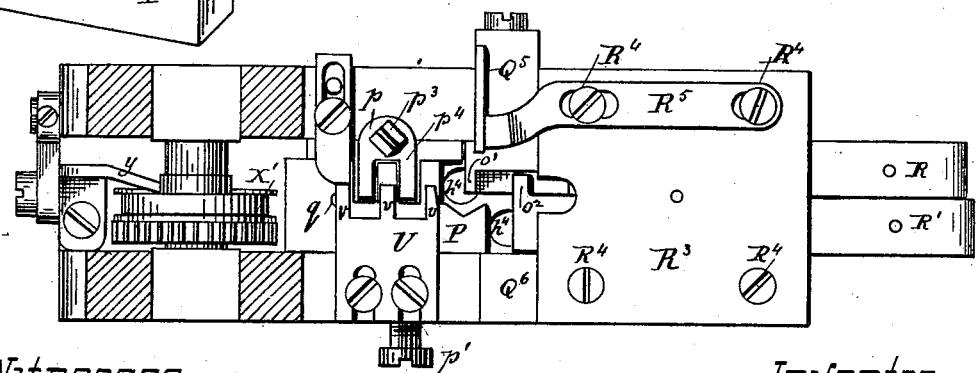
Witnesses:
John C. Dewey
Edwin E. Moore
Inventor:
Daniel C. Stover,
By Thos. H. Dodge,
Attorney.

UNITED STATES PATENT OFFICE.

DANIEL C. STOVER, OF FREEPORT, ILLINOIS, ASSIGNOR TO THE WASHBURN & MOEN MANUFACTURING COMPANY, OF WORCESTER, MASS.

MACHINE FOR MANUFACTURING METALLIC-STRIP FENCING.

SPECIFICATION forming part of Letters Patent No. 240,477, dated April 19, 1881.

Application filed September 3, 1880. (Model.)

*To all whom it may concern:*

Be it known that I, DANIEL C. STOVER, of Freeport, in the county of Stephenson and State of Illinois, have invented certain new and useful Improvements in Machines for Manufacturing Barbed Metallic-Strip Fencing by a Continuous and Automatic Operation; and I do hereby declare that the following is a full, clear, and exact description of the same, reference being had to the accompanying drawings, forming a part of this specification, and in which—

Figure 1 represents a top or plan view of my aforesaid improved barb-fence machine, which will be hereinafter more fully described. Fig. 2 represents a side view of the machine shown in Fig. 1, looking in the direction of arrow 1, same figure. Fig. 3 represents an opposite-side view of the machine from that shown in Fig. 2, as indicated by arrow 2, Fig. 1. Fig. 4 represents an end view of the machine, looking in the direction indicated by arrow 3, Fig. 1. Fig. 5 represents a vertical longitudinal section through a portion of the machine, taken on line A B, Fig. 1, looking in the direction indicated by arrow 4, same figure. Fig. 6 represents a top or plan view of a portion of the machine, which will be hereinafter more fully explained. Figs. 7, 8, and 9 represent vertical sections through different parts of the machine, taken on lines C D, *a a*, and *b b*, respectively, Fig. 6, which sections will also be hereinafter more fully described. Fig. 10 represents, upon an enlarged scale, the manner in which the barb-strip is cut to form the barbs, one of said barbs being shown by full lines cut and its ends bent down, as hereinafter described, preparatory to being applied to the main strip. Fig. 10ª represents, on an enlarged scale, the barb-strip after the action of the first two cutters, as shown at O, and after the action of the last cutter or die, as shown at O'. Fig. 11 represents a section on line *a' a'* through the barb shown in Fig. 10, looking in the direction indicated by arrow 6, same figure. Fig. 12 represents a section of finished barbed-strip fencing such as is manufactured by my aforesaid barb-fence machine; and Fig. 13 represents a cross-section through said fencing shown in Fig. 12, taken on line *b' b'* of said figure, looking in the direction indicated by arrow 7, same figure. Fig. 14 represents, in perspective, the head of the rocking lever carrying the cutters, the view being taken so as to show the under side or edges of the cutters. Fig. 15 represents, in perspective, a detached view of the stripper used in connection with two of the cutters. Fig. 16 represents, in perspective, a detached view of the die-block of the machine. Figs. 17 and 18 represent, in perspective, the barb-folders of the machine. Fig. 19 represents, in top view, the anvil, die-block, stripper, barb-folders, &c., in their relative position.

My invention consists in so arranging and constructing a machine that barbed fencing may be manufactured by said machine from flat strips of metal, the whole operation of feeding the main strip longitudinally through the machine, feeding in the strip from which the barbs are cut at right angles to the main strip, cutting the barbs from the latter, and securing the same to the main strip being performed by a continuous rotation of the main shaft and automatic operation, as will be hereinafter more fully explained.

To enable those skilled in the art to which my invention belongs to make and use the same, I will proceed to describe it more in detail.

In the drawings, E represents the bed or table, upon which the several parts of the machine are arranged and secured, and F F, standards, upon which it is supported.

Driving-power is imparted to the machine by means of a large driving wheel or pulley, G, which may be operated by belt-connection with any suitable and convenient driving mechanism. Said driving-pulley G is arranged upon the end of a horizontal driving-shaft, H, which is arranged to turn in suitable bearings I I', formed or secured upon bed E. Upon said driving-shaft H are also secured cam J, bevel-gear K, cam L, and small spur-gear M. Cam J operates a rocking lever, N, which is provided with an angular-shaped head, N', in which the barb-cutters are arranged and secured as hereinafter described; bevel-gear K operates the barbing portion of the machine; and cam L and spur-gear M operate the main strip-feeding mechanism.

Rocking lever N is pivoted at each side upon short pointed shafts or spindles *c c*, which may be adjusted in or out of bearings $N^2 N^2$, and secured after such adjustment by means of set-screws $d\ d$, screws $e\ e$, and holding-nuts $N^3 N^3$. The inner pointed ends of spindles $c\ c$ are made conical-shaped, as represented by dotted lines, Fig. 1 of the drawings, and the ends of laterally-projecting arms $N^4 N^5$ are provided with correspondingly-shaped openings to receive them. By this arrangement of rocking lever N, and by allowing for considerable lateral motion of the same between bearings $N^2$, as shown in Fig. 1, it will be seen that said lever and its cutters may be easily and conveniently adjusted laterally in either direction, if necessary. The rear end of rocking lever N, as will be observed by Figs. 2 and 5 of the drawings, is made fork-shaped, so as to fit over and receive the action of its operating-cam J, while its forward end is box-shaped, to receive and hold the barb cutters and folders $g\ g$, cutter $h$, and barb-holder $i$. Said cutters and holder are rigidly held in position in box or head N' by means of a holding-plate, $k$, screw $l$, and screw $m$. They may be adjusted vertically by means of adjusting-screws $n$, which are fitted to work up and down in the upper part of head N', as represented by dotted lines in Fig. 4 of the drawings. The cutter-folders $g\ g$ make the cuts $g'\ g'$ and $g^2\ g^2$, and also bend down the ends $g^3\ g^3$ of the barb, as shown in Fig. 10. Cuts $g'\ g'$ are made by the cutting-edges $g^4\ g^4$ of the cutters and $g^5\ g^5$ of die P, and cuts $g^2\ g^2$ by the cutting-edges $g^6\ g^6$ and $g^7\ g^7$. The cutting-edges $g^6$ being rounded, as represented in Fig. 4, serve to bend the ends $g^3$ down, as above stated, at the same time that the cuts $g^2$ are formed. The angular cuts $h'\ h'$ of the barbs, which form the points, are made by the cutting-edges $h^2\ h^2$ of cutter $h$ and $h^3\ h^3$ of die P. After the last-mentioned cuts are made, the waste pieces of stock O' of barbs O (shown by dotted lines, Fig. 10) are allowed to drop through an opening, $h^4$, cut through block P' and bed E into a suitable receptacle placed underneath to receive them.

The ends $g^3 g^3$ of the barbs, which are bent down into a perpendicular position, as before stated, by cutters $g\ g$, are folded under and around the main strip Q, (shown by dotted lines, Fig. 1,) so as to secure them upon the latter, by means of sliding folders R R', which are operated to slide in opposite directions to each other by cams S S', secured upon the same shaft T which operates the barb-strip-feeding mechanism. Said folders are retained in position by a plate, $R^3$, secured by screws $R^4$ to the top of block P'. The top of folder R is notched or cut out as represented at $o$, and its end provided with a shoulder or projection, $o'$, while the forward end of folder R' is provided with a projection, $o^2$, which travels back and forth in notched portion $o$. The ends $g^3$ of the barbs are folded about the main strip Q by the projections $o'\ o^2$, being brought together by the action of aforesaid cams S S', the barb having been fed forward, so as to straddle the main wire, by the feeding mechanism hereinafter described. While the bent ends $g^3$ of the barbs are being folded under the main strip Q by the parts $o'\ o^2$, as before explained, said barb is held in a very firm and rigid position upon the main strip by the lower end of spring-holding piece $i'$ of barb-holder $i$ pressing upon the top of the same. Said part $i'$ is provided with a spiral spring, $i^2$, as shown in section, Fig. 5, which allows of its being forced up as the head N' of rocking lever N is lowered by cam J. The barb-strip is raised so that the bent ends $g^3$ will not strike and retard its progress as it is fed forward over the main strip Q, as above stated, by means of an angular-shaped springing part, $p$, and pin $q$. (Shown in section, Figs. 8 and 9 of the drawings.) Springing part $p$ is so arranged, by means of a spiral spring, $p'$, and holding or locking nuts $p^2\ p^2$, (see Fig. 9,) that its top is held upon a level with the top of die-block P. To prevent cutters and benders $g\ g$ striking against the same when they descend to cut the barbs, a screw, $p^3$, is secured in springing part $p$, against which the under side of head N' strikes and forces said part $p$ down out of the way. As soon as the cutters have performed their office, and the pressure upon screw $p^3$ is released by head N', spiral spring $p'$ forces up the part $p$ into its normal position, as represented in the drawings, thereby raising the barb-strip, as before stated, by the upper sides of the projecting parts $p^4$ bearing against the lower ends of bent portions $g^3 g^3$. Pin $q$, which is also arranged to be operated by a spiral spring, $q'$, serves to raise the barb-strips so that their bent ends will pass over and straddle the main strip, as before stated, preparatory to their being folded under the main strip Q by projections $o'\ o^2$ of folders R R', as before described.

The barb-strip is prevented from adhering to the cutters after the cuts are made by an adjustable "stripper," U, which is provided with projecting fingers $r$, which extend in between the cutters and strip the same from said cutters as the latter are raised.

Die-block P may be adjusted, if necessary, by turning set-screw $r'$, which holds said block in place.

The main strip Q is fed forward into and through the machine by means of feed-rolls V V', which are operated by means of spur-gear M on shaft H, through spur-gears M' $M^2$, disk W, horizontal shaft $M^3$, and spur-gears $V^2 V^3$. The upper feed-roll, V', and its gear $V^3$ are arranged loosely upon an eccentric-shaft, $M^4$, as represented by dotted lines, Figs. 2 and 3 of the drawings. Therefore, by turning hand-lever $M^5$, which is secured to the end of said eccentric-shaft, up or down, the upper feed-roll may be raised off of the lower one, so that strip Q may be inserted between the rolls, or lowered, so as to produce a pressure upon said strip to feed it forward when the rolls are in operation.

The shipping and unshipping mechanism of the machine may be of ordinary construction, arrangement, and operation, and therefore requires no detailed description, an ordinary clutch, G', operated by a connecting-rod, G², and hand-lever G³, being in this instance employed for the purpose, which locks and unlocks the hub of the main driving-wheel G to or from a notched wheel or disk, G⁴, which is secured upon shaft H.

The feed-rolls are stopped at stated intervals to allow of the barbing operation, hereinafter described, and turned so as to feed the main strip forward the distances that the barbs are required to be secured apart upon said strip in the following manner:

Spur-gear M² is fitted loosely upon shaft M³, while disk W is secured upon said shaft, and a leather or other washer, W², is placed between them in a recess formed in said disk, as represented by dotted lines, Fig. 1. Said washer is for the purpose of producing a friction to turn both together, or independently of each other, as hereinafter described.

During the barbing operation the feed-rolls are stopped by the end of a pawl or lever, W³, pivoted at W⁴, catching against one of the cogs, W', which are formed or secured upon the periphery of disk W. Said pawl or lever is held down upon the surface of disk W by means of a flat spring, W⁵, secured at W⁹, and is forced up from in front of cogs W', so as to allow the disk and feed-rolls to turn, by cam L, secured upon shaft H. Cam L is of the proper form and cogs W' at the proper distances apart to stop and feed forward strip Q as required, and at the proper time to act in unison with the barbing mechanism of the machine.

The barbing mechanism is arranged and operates in the following manner: The strip from which the barbs are formed is fed into the machine by means of feed-rolls X X', which are operated by bevel-gear K, through bevel-gear K', shaft T, which turns in bearings Z Z', cam T', slotted swinging arm T², connecting-rod T³, crank-lever T⁴, ratchet-wheel T⁵, its pawl s, shafts T⁶ T⁷, and spur-gears T⁸ T⁹. The upper feed-roll, X', is raised and lowered by means of an eccentric-shaft and hand-lever, Y, in the same manner that feed-roll V' is raised and lowered, as before described. Shafts T⁶ and T⁷ are arranged to turn in suitable bearings, X² X³, which are loosely fitted between standards X⁴ X⁵, formed or secured on block P'. The bearings X³ of eccentric-shaft T⁷ are provided with circular recesses in their upper sides, (see Fig. 6,) in which rubber or other springs t are arranged, and adjustable screws t', that pass through cap-piece t², which is secured to the tops of standards X⁴ X⁵, bear upon the tops of said rubber springs. By this arrangement it will be seen that a slight upward springing motion is given to the upper feed-roll, X', thereby enabling it to adjust itself to different thicknesses of strips, and to allow bunches or other defects in said strips to pass between the rolls without injury to the same or adjoining parts. A greater or less pressure may be produced upon the strip by turning adjusting-screws t' up or down. Swinging arm T² is hinged upon a pin, u, secured in the upper end of a standard, u', formed upon bearing Z', and the opening or slot in said swinging arm (represented by dotted lines u², Fig. 4) is made of the proper size and form to fit over and receive the action of its operating-cam T', which is also shown by dotted lines in Fig. 4. The several parts of the feeding mechanism are so constructed and arranged as to turn feed-rolls X X' just far enough to feed forward the barb-strip a sufficient distance to form the barbs, and to then stop said feed-rolls during the operation of cutting and securing said barbs upon the main strip Q, and to allow the latter to be fed forward to where the next barb is to be applied upon the same, thus acting in unison with the main-strip-feeding mechanism to form the finished barbed fencing. (Shown in Fig. 12.) Pawl s, which is pivoted at v to crank-lever T⁴, is held against ratchet-wheel T⁵, so as to catch into notches v', by means of a wire or other spring, v², (attached to crank-lever T⁴ at v³,) and pin v⁴, against which said spring bears. Hand-lever Y is prevented from striking or resting upon the surface of ratchet-wheel T⁵ by a pin, w, secured in the side of standard X⁵. The barb-strip is properly guided in between feed-rolls X X' by passing through an adjustable pivoted guide, x, secured at x' to bed E, and by another guide, y, just prior to entering said rolls, which is secured at y' to block P'. Said barb-strip is prevented from slipping out from between the rolls as it is fed forward by flanges z z, which are formed on the outer edges of the lower feed-roll, X.

The part z' of guide x, which is provided with a slot or opening, z², for the passage of the barb-strip, may be turned, if desired, being loosely fitted in guide x and held in place by a set-screw, z³. (See Fig. 3 of the drawings.)

In Figs. 6 and 7 rocking lever N, cap t², plate R³, and adjustable guide R⁵ are not shown, in order to represent the parts coming under the same more fully.

The main and barb strips are uncoiled from reels, arranged at a convenient distance from the machine, as they are fed into the machine by their respective feed-rolls, as hereinbefore described, said reels being supported and arranged to turn upon suitable standards or frames.

Having described the several parts of the machine in detail, the operation of the same may be briefly summed up thus:

The attendant first raises feed-roll V' off of feed-roll V by means of hand-lever M⁵, as before described, when he then passes the end of strip Q into and through a guide, Q², in front of the feed-rolls; thence between said feed-rolls, and drawing it forward passes it into and through an opening, Q³, formed in rocking-lever arm N⁴; thence over a plate, Q⁴, secured to the side of block P′, with one side of the strip in close contact with the side of a guide-piece, Q⁵, secured or formed upon plate Q⁴; thence under an adjustable guide, R⁵, secured to the top of plate R³ and block P′, over the ends of folders R R′, under barb-holder i′, over plate Q⁶, secured in the upper surface of block P′, and, drawing it still farther forward to the reel upon which it is to be coiled, fastens it to one of the arms of said reel and there leaves it. He now raises feed-roll X′ off of the lower one, X, by means of hand-lever Y, after which he then takes the end of the strip from which the barbs are formed, and passes it into and through adjustable guide x; thence between the feed-rolls X X′, and pushing it through, draws it forward over die-block P, pin q, and a sufficient distance over the dies for the cutters to act upon it. He now starts up the machine, when the barbs are then cut, secured upon the main strip, and the finished barb-fencing material fed forward as fast as it is made, and coiled upon suitable reels prepared for the purpose by a continuous and automatic operation.

Those skilled in the art to which my invention belongs will readily understand and appreciate the practical advantages resulting from constructing and arranging a machine as hereinbefore shown and described. By its operation barbed-strip fencing such as shown and described can be manufactured in a very perfect and expeditious manner.

The several parts of the machine being simple in construction are therefore not liable to be easily broken or otherwise deranged.

Having described my improvements in machines for manufacturing barbed metallic-strip fencing, what I claim therein as new and of my invention, and desire to secure by Letters Patent, is—

1. The combination, with the head N′ of the rocking lever N, of the combined cutters and binders g g, having similar cutting-edges, cutter h, die P, barb-holder i, and plate k, as and for the purpose set forth.

2. The combination, with the head N′ of the rocking lever N, of cutters and benders g g, cutter h, and die P, provided with grooves to receive said cutters, as and for the purpose set forth.

3. The combination, with the head of a rocking lever carrying cutters and benders g g and cutter h, of the die-block P′, provided with two parallel openings for the cutter-binders, and opening h⁴, as and for the purpose set forth.

4. The combination, with the head of a rocking lever carrying cutters and benders and a corresponding die to receive said cutters and benders, of block P′, folders R R′, and plate R³ over said folders, as and for the purpose set forth.

5. The combination, with the head of a rocking lever carrying a barb-holder, of sliding folders R R′ and cams S S′, as and for the purposes set forth.

6. The combination, with the head of a rocking lever carrying cutters and benders, and a die correspondingly grooved to receive them, of block P′ and springing part p, as and for the purposes set forth.

7. The combination, with the head of a rocking lever carrying cutters and benders, and a die correspondingly grooved to receive them, of pin q, projecting from said die and resting upon a spring to raise the barb-strips so that they will pass over and straddle the main strip, as set forth.

8. The combination, with the block P′ and springing part p, of spring p′ and locking-nuts p² p³, as and for the purposes set forth.

9. The combination, with the head of a rocking lever carrying cutters and a barb-holder, of die P, block P′, folder R, having a groove, O, and projection O′, and folder R′, having the projection O², as and for the purposes set forth.

10. The combination, with the head of a rocking lever carrying cutters and benders g g, and a die, P, correspondingly grooved to receive them, of the adjustable stripper U, provided with fingers r, as and for the purposes set forth.

11. The combination, with the head of a rocking lever carrying cutters and benders, and a die, P, having grooves to receive them, of the bed-plate E, feed-rollers X′, and guide x, pivoted to the frame and carrying a removable cylindrical block, z′, provided with a slot, z², and guide y, as and for the purposes set forth.

12. The combination with the head of a rocking lever carrying cutters and benders, a die-block having grooves to receive them, and rolls adapted to feed a strip of metal under said cutters, the block P′, holding-plate R³, and adjustable guide R⁵, whereby a second strip of metal is directed at right angle to the path of the first strip, as and for the purposes set forth.

13. The combination of rolls provided with flanges constructed to feed a strip of metal, cutters and benders, a cutter, and a die, adapted to make a square cut on one edge of the strip and a cut at an acute angle on the other edge and bend the strip, with rolls constructed and arranged to feed a second strip of metal across the path of the first strip, and with folding devices and means for operating, substantially as shown and described, whereby barbed metal-strip fencing is made by a continuous rotation of the main shaft, as set forth.

DANIEL C. STOVER.

Witnesses:
LOUIS KARCHER,
CHARLES T. GREEN.